(12) United States Patent
William Söderström et al.

(10) Patent No.: US 6,321,222 B1
(45) Date of Patent: Nov. 20, 2001

(54) METHOD FOR MULTIPLE TASK SEARCHING

(76) Inventors: Gert Peter William Söderström, Allingsåsvägen 30, 121 48 Johaneshov; Denny Bo Ingvar Tellander, c/o Johansson, Kronobergvägen 7, 112 38 Stockholm, both of (SE)

( * ) Notice: Subject to any disclaimer, the term of this patent is extended or adjusted under 35 U.S.C. 154(b) by 0 days.

(21) Appl. No.: 09/328,934

(22) Filed: Jun. 9, 1999

(51) Int. Cl.[7] .............................. G06F 7/00; G06F 17/30
(52) U.S. Cl. .............................. 707/5; 707/3; 707/104.1; 709/225; 709/245; 709/223; 345/853
(58) Field of Search .......................... 707/4, 5, 10, 101, 707/102; 709/200, 201, 203, 217, 219, 227, 229

(56) References Cited

U.S. PATENT DOCUMENTS 5,918,239 * 6/1999 Allen et al. ........................ 707/526
5,963,720 * 10/1999 Grossman ........................ 395/200.8
6,125,395 * 9/2000 Rosenberg et al. ................. 709/228
6,167,449 * 12/2000 Arnold et al. ..................... 709/227
6,243,749 * 6/2001 Sitaraman et al. ................. 709/223

* cited by examiner

*Primary Examiner*—Thomas Black
*Assistant Examiner*—Jacques Veillard
(74) *Attorney, Agent, or Firm*—Fasth Law Offices; Rolf Fasth

(57) ABSTRACT

A first, second, and third field are positioned so that each field is separate and distinct from one another. The first field is linked to a protocol list that may be opened and scrolled down to find a suitable protocol. Similarly, the third field is linked to a top domain list so that the user may scroll down the list and select a top domain. A first address or name is entered into the second field to connect to a first web site. By entering a second address or name to the second field, a second web site may be connected to without having to change any of the other fields. A variety of activation buttons may be used to retrieve the information in the second field and add search commands to reach and search data bases on a variety of web sites.

12 Claims, 4 Drawing Sheets

METHOD FOR MULTIPLE TASK SEARCHING

TECHNICAL FIELD

The present invention relates to a method for quickly connecting to and finding addresses and other information on the internet. In addition, present invention relates a convenient method of multiple task searching.

BACKGROUND AND SUMMARY OF THE INVENTION

The internet is now becoming established in the industrialized world. However, some of the internet address are both long a complicated. Most of the addresses are also difficult to remember and cumbersome to work with when searching on the internet. This is a particular problem when multi-tasks must be performed such as searching in different data bases for the same domain name.

The various domains and pages on an internet address are typically separated by period and/or slashes according to the uniform resource locator (URL). To change one or many of the components of the address it is necessary to precisely position the cursor on the relevant portion of the address and carefully remove/add certain segments without inadvertently changing other segments of the address.

If it is necessary to search several data bases for the same domain name, a user must either type in very long and complicated addresses for each search. In the alternative, the user must find each web site and conduct a separate search at each web site for the same domain name. This is both cumbersome and time consuming to do.

There is a need for a more simple way of connecting to and searching a variety of internet addresses. There is also a need for an easier way to conduct multiple task searching on the internet. Particularly, there is a need for an improved method for conducting multiple tasks, such as searching, electronic mailing, facsimile and telephone transmission that are related to the same specific domain name.

The present invention is a method of accessing and searching web sites on the internet. The program has first, second and third fields wherein the fields are separate and distinct from one another. The first field is linked to a protocol list that may be opened and scrolled down to find a suitable protocol. Similarly, the third field is linked to a top domain list so that the user may scroll down the list and select a top domain. A first address or name is entered into the second field. It is now possible to connect to a first web site. By entering a second address or name to the second field, a second web site may be connected to without having to change any of the other fields. The invention also includes a variety of activation buttons that retrieve the information in the second field and add search commands to reach and search data bases on a variety of web sites.

DETAILED DESCRIPTION

Figure 1:
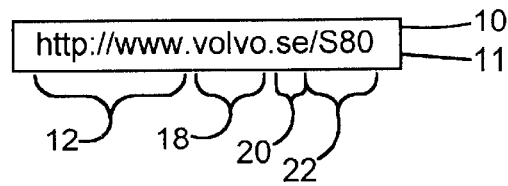
FIG. 1 is a schematic view of a typical internet address.
Figure 2:
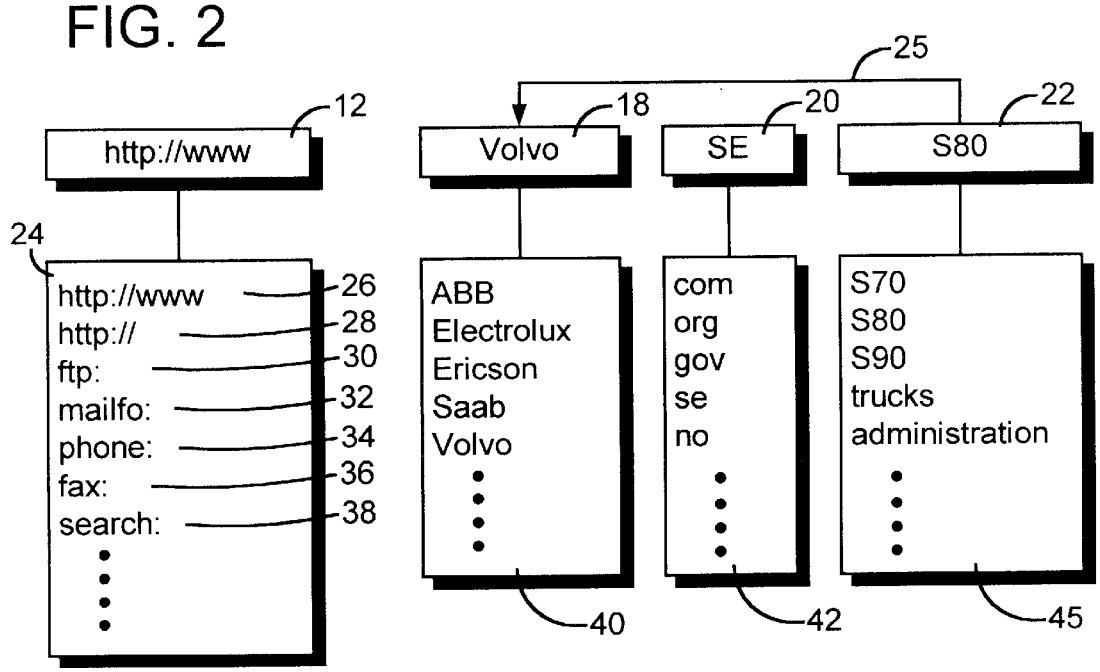
FIG. 2 is a schematic view of the scroll down features of each field.
Figure 3:
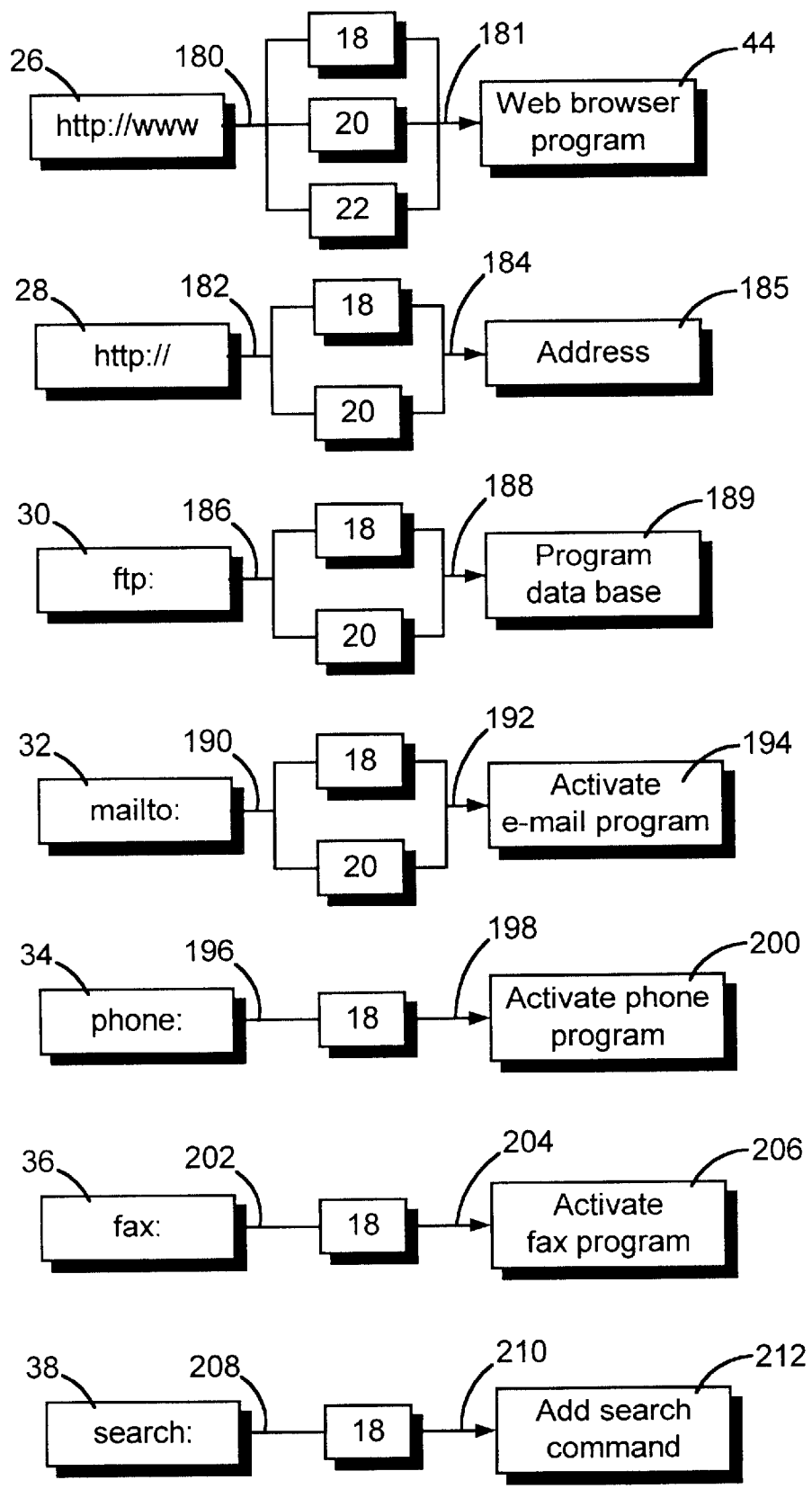
FIG. 3 is a schematic view of protocols in the first field.

With reference to FIGS. 1–9, the present invention is an effective way of accessing, using and searching on an electronic communication systems such as the internet. As best shown in FIG. 1, a typical internet address has several components according to the uniform resource locator (URL). example, an internet address 10, such as a home page address 11, typically has a prefix 12 that may include a protocol 14 and a sub-domain 16. The address 10 also includes a second level domain 18 and a top domain 20. The second level domain 18 may include several sub-pages 22.

An important feature of the present invention is that the prefix 12, second level domain 18, top domain 20 and sub-page 22 are disposed in separate fields. This makes it easier to make changes in each field 12, 18, 20 and 22 without inadvertently changing the adjacent fields. However, by leaving the fields, 12, 20 and 22 blank, the field 18 may be used as a conventional search field and can accept a full address to, for example, a web site.

The prefix or field 12 may include a wide variety of protocols and/or sub-domains stored in a prefix table 24 such as http://www 26, http:// 28, ftp: 30, mailto: 32, phone: 34, fax: 36, search 38. It should be understood that the prefix table 24 may include many more protocols and sub-domains, as desired. The user may open the table 24 in a pulldown menu and scroll down to the desired protocol without having to type relatively complicated protocols. If the required protocol is not listed in the table 24, then the user may manually enter the protocol into the field 12.

More particularly, when http://www 26 protocol is selected for the field 12, a signal 180 may be sent to the fields 18, 20, 22 to retrieve the information contained in the fields. The retrieved information is then sent via a signal 181 to a web browser program 44, such as the Internet Explorer or Netscape, to activate the web browser program to find the desired web site on the world wide web.

The http:// 28 protocol is, for example, used by search engines, such as Yahoo and Altavista, and company home pages. A signal 182 is sent to retrieve information from the fields 18, 20 and a signal 184 is then sent to reach the desired search engine or address 185. The ftp: 30 protocol relates to a file transmission protocol that is used when retrieving files from a web server. When the ftp: 30 mode is used, a signal 186 is sent to the fields 18, 20 to retrieve the information contained in the-fields and the retrieved information is sent via a signal 188 to a program data base 189.

The mail to: 32 protocol may send a signal 190 to the fields 18, 20 to retrieve the information therefrom and sends a signal 192 to activate and enter the information from the fields 18, 20 into an e-mail program. The user may then send a message to the e-mail address based on the retrieved information from the fields 18, 20.

The phone: 34 protocol may be used to telephone a telephone number entered in the field 18. A signal 196 is sent to the field 18 to retrieve the information in the field 18 and a signal 196 is sent to activate a phone program 200. In the alternative, a second level domain may be enter into the field 18 and the information may be used to search an address list stored on the host computer, such as an e-mail address book, the desired telephone number may be found by searching the address book without requiring the user to enter the telephone number in the field 18.

Similarly, the fax: 36 protocol may be used to fax a fax number or company name entered in the field 18. A signal 202 may be sent to the field 18 to retrieve the information in the field 18 and a signal 204 is sent to activate a fax program 206.

The search: 38 protocol may be used to search for information about the address entered in the field 18. A signal 208 is sent to retrieve the address from the field 18. A signal 210 is sent to add a search command to a search engine to perform a search on the address retrieved from the field 18.

The second level domain or field 18 may represent the registered domain name or address in the respective top domain 20. For illustration purposes, the second level domain name "volvo," top domain "se" and sub-page "S80" may been used. "S80" is a car model of Volvo. In the United States, the top domains com, org, gov etc. represent the type of organization of the second level domain 18. In countries outside the United States, the top domain 20 often represent the country of the second level domain 38. In this way, volvo.se means that volvo is a registered domain name in Sweden. For example, the registration of all Swedish domain names may be found in a database 40 such as a domain name server (DNS) web-site database for Sweden. Similarly, the registration of all US domain names may be found in a data base controlled by the Internic.

The top domains 20 may be stored in a top domain table 42 and each top domain in the table 42 may be accessed through a convenient pull down menu. The sub-pages 22 may be linked to the second level domain 18 via a signaling link 25 so that the sub-pages 22 depend upon what address is entered in the second level domain 18. By typing the desired sub-page in the sub-page 22, the user may go directly into the sub-page of the particular domain name that has been entered in second level domain 18. For example, by typing "S80" in the sub-page 22 of the above illustrative example, the user may access Volvo's intra-net system and read about the S80 car at Volvo's Swedish home page. The various sub-pages 22 may be stored in a sub-page database 45 at the web-site of the domain name in the second level domain 18. The sub-page 22 may be changed without changing the other fields, 12, 18, 20 so that different sub-pages under the second level domain 18 may be accessed. In certain cases, the sub-page 22 may be fixed and only the second level domain 18 and/or the top domain 20 are changed.

Figure 5:
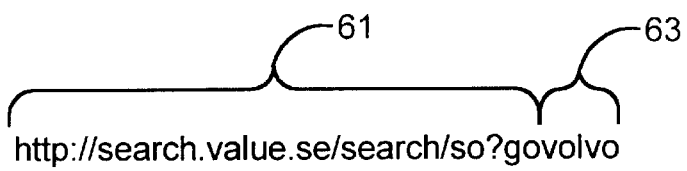
FIG. 5 is a schematic view of a search command positioned before the domain name.
Figure 6:
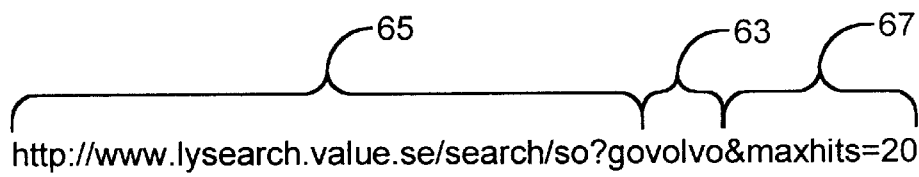
FIG. 6 is a schematic view of a search command positioned both before and after the domain name.

The present invention includes a plurality of activation buttons 60–78 that are associated with the address or name that has been entered into the second level domain 18. As best shown in FIG. 5, the activation buttons 60–78 may add a long and complicated string 61 before a name 63 retrieved from the field. As shown in FIG. 6, the activation buttons 60–78 may add complicated and long strings 65, 67 both before and after the name 63. In this way, the user does not have to remember or add the required strings before and after name 63 to be searched.

Figure 4:
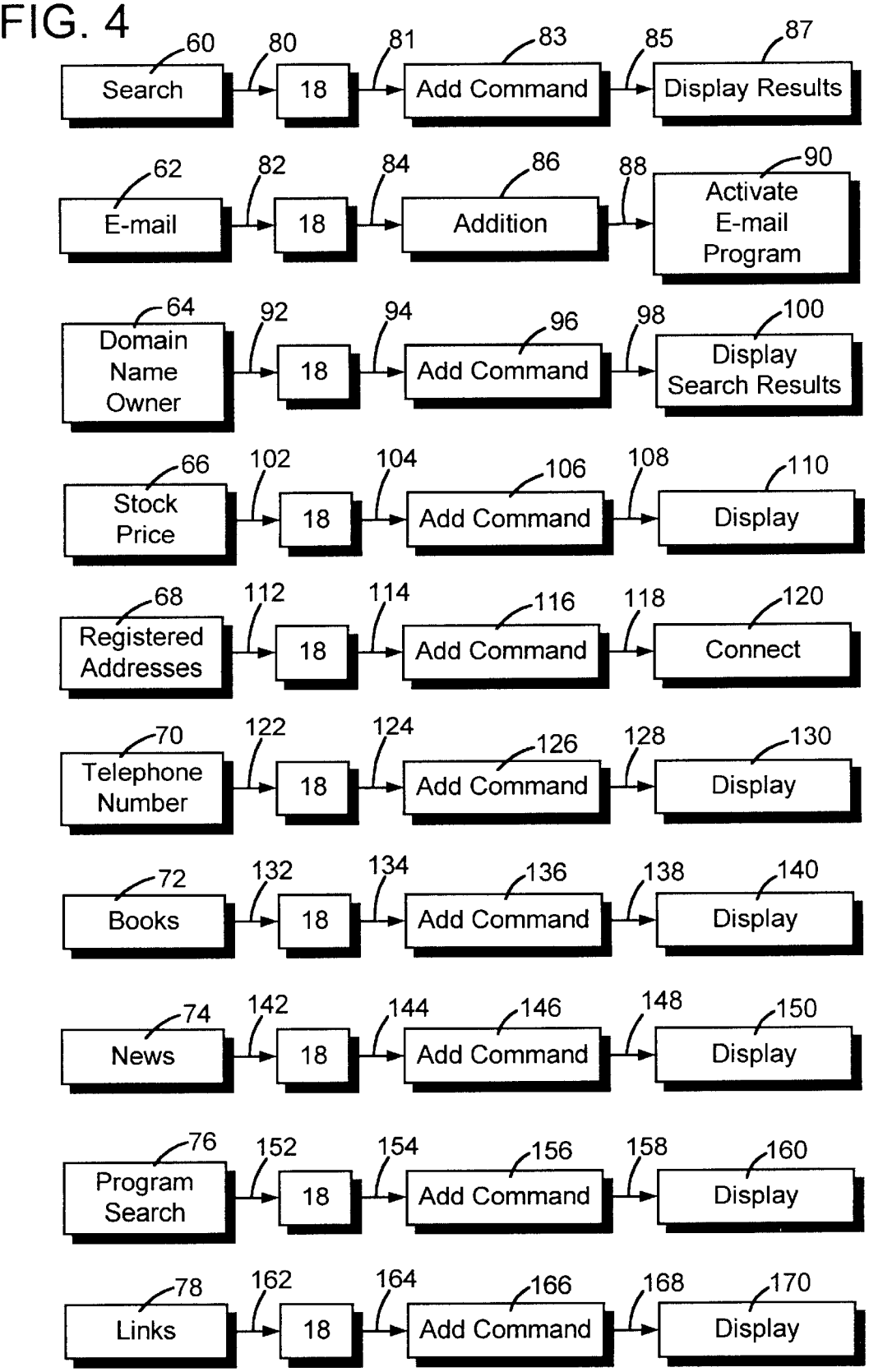
FIG. 4 is a schematic view of a set of activation buttons of the present invention.

As best shown in FIG. 4, the search button 60 may send a signal 80 to retrieve the information contained in the field 18 and the retrieved information may be sent via a signal 81 to an addition device 83 that adds a web site address and search commands to reach the desired search engine. In this way, the addition device 83 sends a signal 85 to the desired web site and the search results are displayed in a display unit 87.

The e-mail button 62 may send a signal 82 to the second level domain or field 18 to retrieve the address in the field 18 and the retrieved information is sent in a signal 84 to an addition device 86 adds, for example, "info@" before the address retrieved from the field 18 and a suitable suffix such as ".se". A signal 88 is sent to an e-mail program 90 in the host computer to activate and display the pre-addressed e-mail, such as info@volvo.se. The user may then enter a message to the pre-addressed e-mail and send the message to the e-mail addressee as specified by the field 18.

By activating the domain owner button 64, a signal 92 may be sent to the field 18 to retrieve the address or company name entered in the field 18. The retrieved information is sent in a signal 94 to an addition device 96 that adds a search command before the address and sends a signal 98 to access and search a web site that includes all registered domain names for a variety of top domains. The search command may typically include the address to and search command for a pre-selected data base of a web server. The search results for the address in the field 18 is displayed in a display unit 100. The search result may indicate in which top domains the address or name has been registered.

By activating the stock price button 66, a signal 102 may be sent to the field 18 to retrieve the domain name (company name) and the retrieved company name is sent via a signal 104 to an addition device 106 that adds a search command to a data base on a web site that contains all the stock prices. The search result is sent via a signal 108 to a display unit 110 to the result of the search for the company name in the field 18 in the stock price data base. The display unit 110 may display the current stock price for the company name in a variety of countries.

The address button 68 sends a signal 112 to retrieve information from the fields 12, 18, 20 and 22, the retrieved information is send via a signal 114 to an addition device 116 that adds a search command to search for the information in At Once's database on a web server. If the information in the signal 114 is found, then the user is connected via a signal 118 to a web address 120 that corresponds to the information in the signal 114. If the information is not found then a not found message is displayed.

The telephone number button 70 sends a signal 122 to retrieve the information in the field 18. The retrieve information is send in a signal 124 to an addition device 126 that adds a search command to access and search a web site of a search engine such as Yahoo.se or the yellow pages. If the information in field 18 is found, a signal 128 in sent to a display unit 130 to display all the telephone numbers to the company name shown in the field 18.

Similarly, the book button 72 sends a signal 132 to is retrieve the information from the field 18, the retrieved information is sent in a signal 134 to an addition device 136 that adds a search command for a book data base on a web server and if books about the name retrieved from the field 18 are found, then a signal 138 is sent to a display unit 140 to display the search results.

The news button 74 sends a signal 142 to retrieve the information from the field 18, the retrieved information is sent in a signal 144 to an addition device 146 that adds a search command for a news data base on a web server, such as Yahoo.se, and if news about the information in the field 18 is found, then a signal 148 is sent to a display unit 150 that displays the search results.

By activating the program search button 76, a signal 152 may be sent to retrieve the information from the field 18. For example, the information in the field 18 could be "zip." The retrieved information is sent in a signal 154 to an addition device 156 that adds a search command for a program data base on a web server and sends a signal 158 to the web site. If programs that end with "zip" are found, then all such programs are displayed in a display unit 160 and can be downloaded.

The link button 78 sends a signal 162 to retrieve the information from the field 18, the retrieved information is sent in a signal 164 to an addition device 166 that adds a search command for a link data base on a web server and if links related to the information in the field 18 are found, then a signal 168 is sent to a display unit 170 to display the search results.

An important feature of the buttons 60–78 is that the buttons may be set to only retrieve information from the field 18 so that the searches may be conducted independent of what information have been entered in the fields 12, 20 and 22. In other words, it is possible to have http://www 26 entered in the field 12 and by pressing, for example, the domain name button 64, a search is conducted using the http:// 28 protocol or any other suitable protocol.

Figure 7:
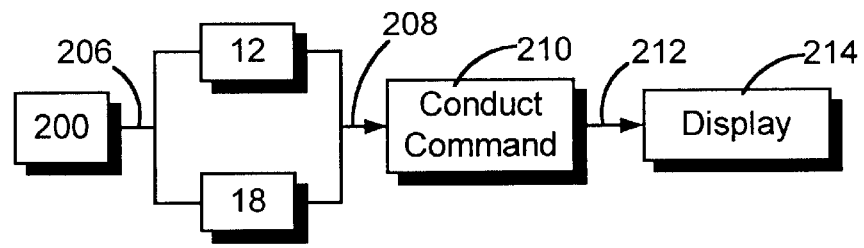
FIG. 7 is a schematic view of a flow diagram of an activation button.

Similarly when not using the activation buttons 60–78, a variety of fields may be used during the search. As shown in FIG. 7, in a task 200, a signal 206 may be sent only to the fields 18, 20 to retrieve information therefrom. The retrieved information may be sent via a signal 208 to an activation device 210 that activates a command, such as activating a program, and a signal 212 is sent to a display unit 214 that displays the result. The display unit 214 may, for example, be a pop-up window.

Figure 8:
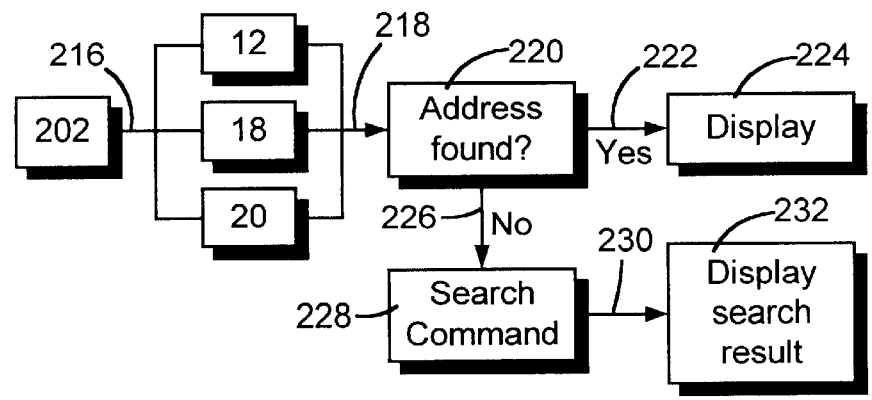
FIG. 8 is a schematic view of a flow diagram of an activation button.

FIG. 8 shows a search 202 that may be used to find and access an internet address. The search 202 may send a signal 216 to retrieve information from the fields 12, 18 and 20. The retrieved information is then sent via a signal 218 to a detection unit 220 that determines if the address was found. If the address was found then a signal 222 may be sent to a display 224 to display the result, such as displaying the home page of the address represented by the fields 12, 18 and 20. If the address was not found, a signal 226 may be sent to a search engine 228 that adds a search command and a signal 230 may be sent to a display 232 that displays the search result.

Figure 9:
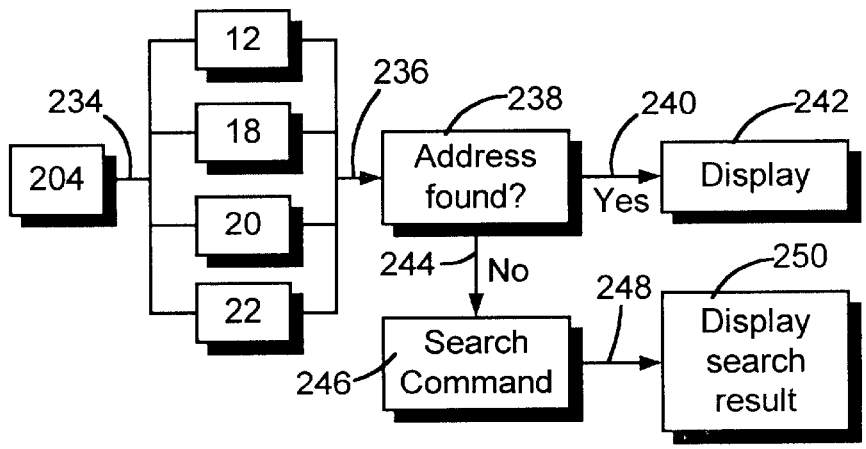
FIG. 9 is a schematic view of a flow diagram of an activation button.

FIG. 9 shows a search 204 that is similar to the search 202. The search is particularly useful when it is desirable to directly access a sub-page of a home page. A signal 234 may be sent to the fields 12, 18, 20 and 22 to retrieve the information from all four fields. The retrieved information may then sent via a signal 236 to a detection unit 238 that determines if the address was found. If the address was found then a signal 240 may be sent to a display 242 to display the result, such as displaying the sub-page represented by the fields 12, 18, 20 and 22. If the sub-page was not found, a signal 244 may be sent to a search engine 246 that adds a search command and a signal 248 may be sent to a display 250 that displays the search result.

When conducting a search, it is only necessary to type in the registered domain name, such as volvo, in the second level domain 18 to reach the Swedish home page of Volvo on the internet because the prefix 12 is, preferably, pre-set to http://www 26 and the top domain 20 is pre-set to se. In the preferred embodiment of the present invention, the second level domain 18 and the sub-page 22 are not pre-set. However, it may also be possible to preset the second level domain 18 and the sub-page 22.

The method of the present invention permits multiple tasks to be conducted for the same address or name entered in the field 16. For example, if the user would like to send an e-mail to the domain name owner of the second level domain 18, the user may activate the button 62 that pre-addresses and activates the e-mail program 90. There is no need to change any of the other address parameters in the fields 12, 20 and 22. In the above example, a message will be sent to Volvo's general e-mail address at info@volvo.se. By changing the top domain 20 to "com" a message will be sent to volvo's general e-mail address in the United States at info@volvo.com. The user may then conveniently search for "Volvo" by activating the button 60 that in turn activates a search engine program, as described above.

In this way, there is no need to manually start an e-mail program and later find the home page of the search engine program and conduct a separate search for volvo on the home page of the search engine program. Similarly, home pages in a variety of countries may be accessed by simply changing the top domain that may be selected from the table 42. The activation buttons provide the same versatility. By simply changing the name entered in the field 18 to, for example, saab, a user may conveniently obtain the same information is about saab, such stock price, news, e-mail, telephone number etc.

It should be understood, that the buttons 60–78 may include other functions than the functions described above. The buttons may be customized to the specific needs of the user. Also, more than four fields may be used to more specific sub-pages may be accessed on the internet.

While the present invention has been described in accordance with preferred compositions and embodiments, it is to be understood that certain substitutions and alterations may be made thereto without departing from the spirit and scope of the following claims.

We claim:

1. A method of accessing web sites on the internet, comprising:

providing separate first, second and third fields, the first field being linked to a protocol list and the third field being linked to a top domain list;

entering a first address to the second field;

displaying and selecting a protocol from the protocol list for the first field;

displaying and selecting a first top domain from the top domain list for the third field;

connecting to a first web site;

entering a second address to the second field, the second address being different from the first address; and connecting to a second web site, the second web site being different from the first web site.

2. The method according to claim 1 wherein the method further comprises providing a first activation button, activating the first activation button, retrieving the second address from the second field, adding a first search command to the second address, connecting to a third web site, changing the second address to a third address in the second field, adding a second search command to the third address, connecting to a fourth web site.

3. The method according to claim 1, wherein the method further comprises selecting a second top domain from the top domain list, connecting to a fifth web site.

4. The method according to claim 1 wherein the method further comprises providing a fourth field, the fourth field begin a sub-page of the second field, entering an address in the fourth field, connecting to a sub-page of the second web site.

5. A method of accessing internet addresses, comprising:
providing first and second fields and an activation button, the first field being remote from the second field;
associating the first field with a protocol domain;
associating the second field with an second level domain;
entering a first address to the second field;
activating the activation button;
retrieving the first address from the second field;
adding a search command to the first address;
searching a web site data base for the first address; and
displaying a search result.

6. The method according to claim 5 wherein the method further comprises providing an e-mail button, activating the e-mail button, retrieving the first address from the first field, adding an e-mail command to the first address, activating an e-mail program, pre-setting the first address in the e-mail program and displaying the e-mail program.

7. The method according to claim 6 wherein the method further comprises providing a stock price button, activating the stock price button, retrieving the first address from the first field, adding a stock price search command to the first address, activating a stock price data base program, searching the stock price data base program for the first address and displaying a stock price for the first is address.

8. The method according to claim 5 wherein the method further comprises providing an address button, activating the address button, retrieving the first address from the first field, adding an address search command to the first address, activating a web browser program and displaying a web site.

9. The method according to claim 8 wherein the method further comprises providing a telephone number button, activating the telephone number button, retrieving the first address from the first field, adding a telephone number search command to the first address, activating a telephone number data base program, searching the telephone number data base program for the first address and displaying addresses that include the first address.

10. A method of accessing web sites on the internet, comprising:
providing first, second and third fields, each field being separate and remote from one another;
associating the first field with a protocol;
associating the second field with an second level domain;
associating the third field with a top level domain;
pre-setting the first field to the protocol and the third field to the top level domain;
entering a first address to the second field;
connecting to a first web site;
entering a second address to the second field; and
connecting to a second web site, the second web site being different from the first web site.

11. The method according to claim 10 wherein the method further comprises providing a fourth field and associating the fourth field with a third level domain, the third level domain being a sub-page of the second level domain.

12. The method according to claim 11 wherein the method further comprises connecting to a sub-page of the second web site.

* * * * *